(12) United States Patent
Ma et al.

(10) Patent No.: US 7,895,217 B1
(45) Date of Patent: Feb. 22, 2011

(54) METHOD AND SYSTEM FOR PROCESSING REQUESTS FOR ACCESSING STORED INFORMATION

(75) Inventors: Xiaoqin Ma, Sunnyvale, CA (US); Shankar Pasupathy, Sunnyvale, CA (US); Paul Mu, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 399 days.

(21) Appl. No.: 12/105,168

(22) Filed: Apr. 17, 2008

(51) Int. Cl.
*G06F 17/30* (2006.01)

(52) U.S. Cl. .................. 707/752; 707/769; 707/791; 711/100

(58) Field of Classification Search ............ 707/705, 707/752, 769, 791; 711/100, 111, 137, 167
See application file for complete search history.

(56) References Cited

U.S. PATENT DOCUMENTS

| | | | | |
|---|---|---|---|---|
| 5,987,469 A | * | 11/1999 | Lewis et al. | ................ 1/1 |
| 2005/0154825 A1 | * | 7/2005 | Fair | .............. 711/113 |

* cited by examiner

*Primary Examiner*—Fred I Ehichioya
(74) *Attorney, Agent, or Firm*—Klein, O'Neill & Singh, LLP (57) ABSTRACT

Method and system for processing a plurality of requests for accessing "small files" stored at a storage device is provided. A user may define file size and each small file may include one or more blocks of data. The requests are sorted based on an address of a first data block for each small file. The sorted requests are then used to access the stored files, instead of accessing the requests based on when a request was received.

20 Claims, 5 Drawing Sheets

FIG. 8

METHOD AND SYSTEM FOR PROCESSING REQUESTS FOR ACCESSING STORED INFORMATION

BACKGROUND

1. Technical Field

The present disclosure relates to storage systems.

2. Related Art

Data today is commonly stored in a sub-network of shared storage devices, for example, magnetic or optical storage-based disks, tape drives and others. Typically, these storage devices are made available to computing systems (for example, servers) that are connected using computer network, for example, a local area network or a wide area network. Different types of servers may be used in existing systems. For example, a storage server, a special purpose processing system may be used for storing and retrieving data on behalf of one or more clients.

Typically, when a storage server receives requests (for example, read requests) from a client application, the storage server processes the requests on a first come, first serve basis. This results in accessing stored data in a random order.

Some client applications request numerous small files in a plurality of requests. Examples of such requests include requests from an anti-virus program for performing a virus check, requests from a back-up application to back-up data; requests for indexing stored files, and others. In conventional systems, the process of randomly accessing stored data in general, and numerous small files in particular, is inefficient because a storage device read head expends seek and rotate time to randomly access various small files scattered all over a storage media.

Therefore, there is a need for a better process and system for processing requests to access small files stored in a storage system.

SUMMARY

In one embodiment, a method and system for processing a plurality of requests for accessing "small files" stored at a storage device is provided. A file is considered to be a "small file" if all data block address pointers for the file are included in a single data structure without being indirectly linked to another data structure. A user may define a small file size and each small file may include one or more blocks of data. The requests for small files are sorted based on an address of a first data block for each small file. The sorted requests are then used to access the stored files, instead of accessing data in the order in which the requests are received.

The process disclosed herein improves the overall speed at which small files are read. The improvement occurs because the process sorts a plurality of small files based on the first data block address for each file. A reading mechanism for a storage device scans data blocks that are next to each other, in a sorted, sequential order. This is advantageous over conventional systems because in conventional systems to read a plurality of small files, the reading mechanism scans the storage device in a random order. The random order used by conventional systems is typically based on the order in which the actual requests for the small files are received.

In yet another embodiment, the sorting methodology used herein is efficient because it is based on using the address of the first data block of a small file. This is useful because one does not waste a lot of computing power to sort the various requests for small files.

The process disclosed herein is useful in various operating environments. For example, without limitation, the process is useful in accessing small files in applications involving virus scanning, backup, file scanning, file indexing and other operations.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

In one embodiment, a method and system for processing a plurality of requests for accessing "small files" stored at a storage device is provided. A file is considered to be a "small file" if all data block address pointers for the file are included in a single data structure without being indirectly linked to another data structure. A user may define a small file size and each small file may include one or more blocks of data. The requests for small files are sorted based on an address of a first data block or each small file. The sorted requests are then used access the stored files, instead of accessing data in the order in which the requests are received.

In one embodiment, a method and system for processing a plurality of requests for accessing "small files" stored at a storage device is provided. A user may define a small file size, and each small file may include one or more blocks of data. The requests are sorted based on an address of a first data block for each small file. The sorted requests are then used to access the stored files, instead of accessing the requests based on a first come first serve basis.

To facilitate an understanding of the various embodiments, the general architecture and operation of a network storage system will first be described. The specific architecture and operation of the various embodiments will then be described with reference to the general architecture.

As used in this disclosure, the terms "component" "module", "system," and the like are intended to refer to a computer-related entity, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device in accordance with the claimed subject matter.

It is noteworthy that the term "file" as used throughout this specification includes a container, an object or any other storage entity.

Figure 1:
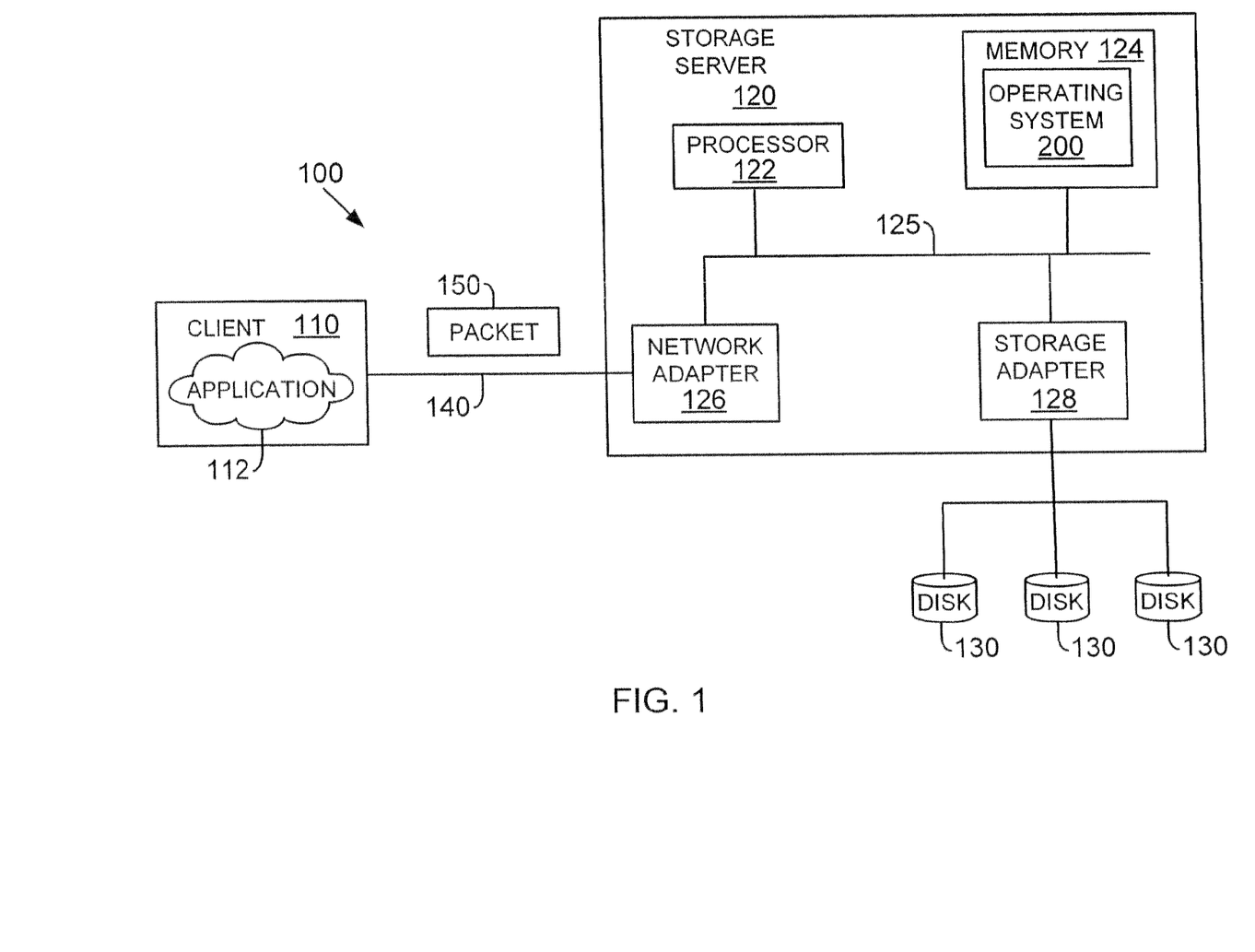
FIG. 1 shows a block diagram of a network system using the methodology of the present disclosure.

Storage/Network System:

FIG. 1 is a schematic block diagram of a network environment 100 including a network storage appliance that may be advantageously used with the various embodiments disclosed herein. The network storage appliance or storage server 120 is a special-purpose computing system that provides services relating to the organization of information on storage devices, such as disks 130. However, it will be understood to those skilled in the art that the inventive embodiments described herein may apply to any type of special-purpose (e.g., server) or general-purpose computer, including a standalone computer.

Storage server 120 comprises a processor 122, a memory 124, a network adapter 126 and a storage adapter 128 interconnected by a bus 125. The storage server 120 also includes an operating system 200 that implements a file system to logically organize the information as a hierarchical structure of directories and files on disks 130.

In the illustrative embodiment, memory 124 may have storage locations that are addressable by processor 122 and adapters (126 and 128) for storing software program code and data structures associated with the embodiments of the present disclosure. The processor 122 and adapters (126 and 128) may, in turn, comprise processing element and/or logic circuitry configured to execute the software code and manipulate the data structures.

The operating system 200, portions of which is typically resident in memory and executed by the processing elements, functionally organizes storage server 120 by, inter alia, invoking storage operations in support of a file service implemented by storage server 120. It will be apparent to those skilled in the art that other processing and memory means, including various computer readable media, may be used for storing and executing program instructions pertaining to the embodiments described herein.

Network adapter 126 comprises the mechanical, electrical and signaling circuitry needed to connect storage server 120 to a client 110 over a computer network 140, which may comprise a point-to-point connection or a shared medium, such as a local area network. The client 110 may be a general-purpose computer configured to execute applications including file system protocols, such as the Common Internet File System (CIFS) protocol block based protocols, e.g. SCSI). Moreover, the client 110 may interact with the storage server 120 in accordance with a client/server model of information delivery. That is, the client may request the services of the storage server, and the storage server may return the results of the services requested by the client, by exchanging packets 150 encapsulating, e.g., the CIFS protocol format over the network 140. The format of the CIFS protocol packet exchanged over the network is well known and described in Common Internet File System (CIFS) Version: CIES-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

It is noteworthy that the storage server, the processes and systems disclosed herein are not limited to processing file based access requests. The adaptive embodiments disclosed herein can support block based storage requests, for example, Small Computer Systems Interface (SCSI) requests.

Storage adapter 128 cooperates with operating system 200 to access information requested by a client application (112). The information may be stored in disks 130. The storage adapter includes input/output (I/O) interface circuitry that couples to disks 130 over an I/O interconnect arrangement, such as a conventional high-performance, Fibre Channel serial link topology. The information is retrieved by storage adapter 128 and, it necessary, processed by processor 122 (or the adapter 128 itself) prior to being forward over system bus 125 to network adapter 126, where the information is formatted into a packet and returned to client 110.

To facilitate access to disks 130, operating system 200 implements a file system that logically organizes the information as a hierarchical structure of directories and may be implemented as set of disk blocks configured to store information, such as text, whereas the directory may be implemented as a specially formatted file in which other files and directories are stored. An example of operating system 200 is Data ONTAPT™ operating system available from Network Appliance, Inc. that implements a Write Anywhere File Layout (WAFL) file system.

Figure 2A:
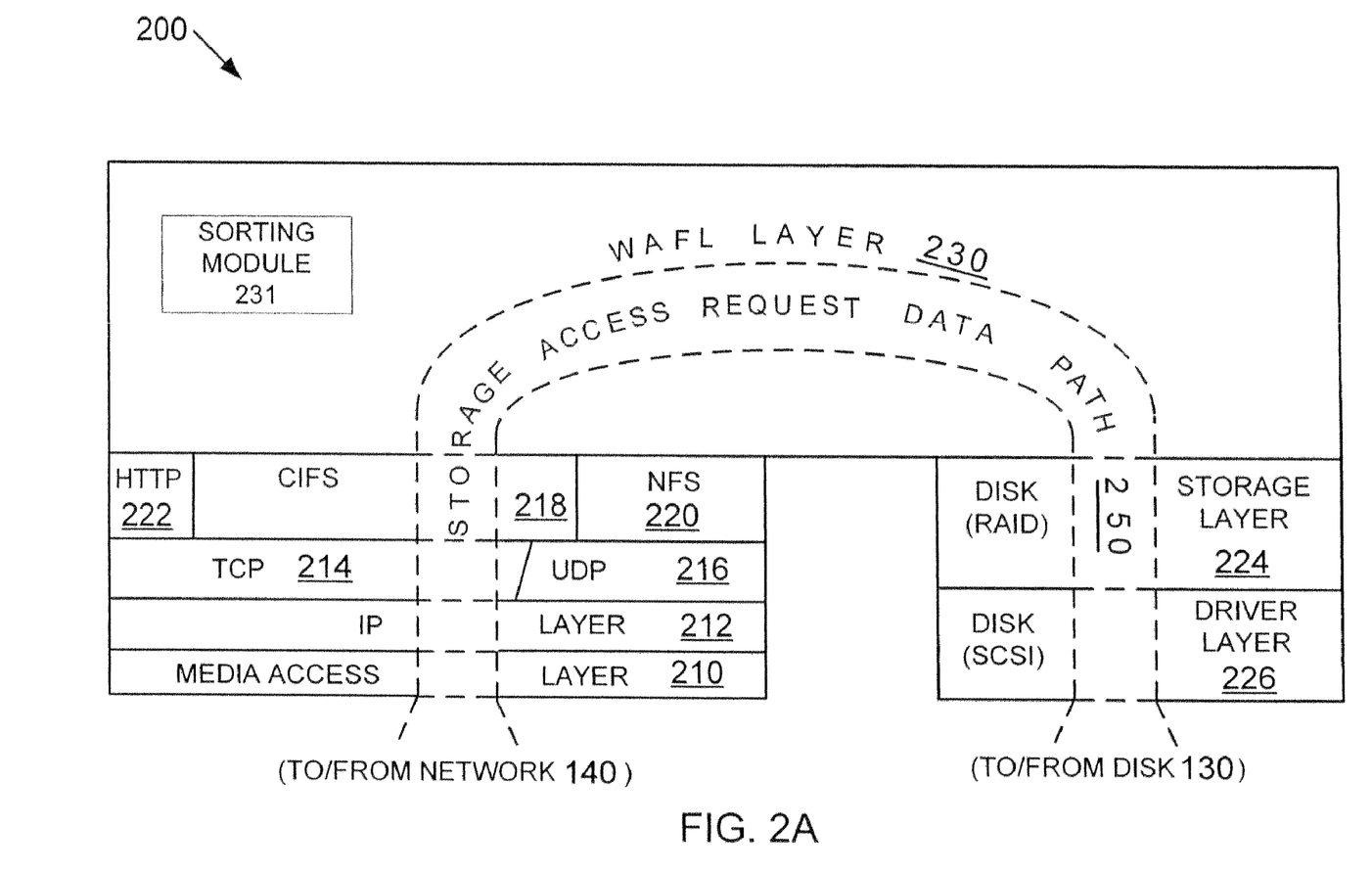
FIG. 2A shows an example of an operating system used by a storage server of FIG. 1.

Operating System Architecture:

FIG. 2A is a schematic block diagram of the Data ONTAP operating system 200 that may be advantageously used with the present invention. The operating system 200 comprises a series of software layers, including a media access layer 210 of network drivers (e.g., an Ethernet ver). The operating system further includes network protocol such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the Network File System (NFS) protocol 220 and the Hypertext Transfer Protocol (HTTP) protocol 222. In addition, the operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL file system layer 230. As described further herein, layer 230 implements the WAFL file system having an on-disk format representation that is block-based, using, e.g., 4 kilobyte (KB) data blocks, and using inodes to describe the files. An inode is a data structure, e.g., a 128-byte structure, which is used to store information, such as meta-data, about a file. The meta-data contained in an inode may include data information, e.g., ownership of the file, access permission for the file, size of the file, file type and location of the file on disk, as described below. The WAFL layer 230 uses a file handle, i.e., an identifier that includes an inode number, to retrieve an inode from a storage disk. The WAFL layer 230 also uses files to store meta-data describing the layout of its file system. These meta-data files include, among others, an inode file.

Operationally, a request from the client 110 is forwarded as, e.g., a conventional CIFS protocol packet 150 (or a block based, SCSI request) over the computer network 140 to the storage server 120. Packet 150 is received by network adapter 126. A network driver media access layer 210 processes the packet, passes it onto the network protocol layers 212 and 214 and CIFS layer 218 for additional processing prior to forwarding to the WAFL layer 230.

The WAFL file system generates operations to load (retrieve) requested data from disk 130 if it is not resident "incore", i.e., in memory 124. If information is not in memory, the WAFL layer 230 indexes into the inode file using the inode number to access an appropriate and retrieve a logical volume block number. The WAFL layer then passes the logical volume block number to the disk storage (RAID) layer 224, which maps that logical number a disk block number and sends the latter to an appropriate driver (e.g., SCSI) of the disk driver layer 226. The disk driver accesses the disk block number from disk 130 and loads the requested data in memory 124 for processing by the storage server. Upon completion of the request, the storage server (and operating system) returns a reply, e.g., a conventional acknowledgement packet defined by the CIFS specification, to the client 110 over the network 140.

The WAFL file system includes a small file sorting module 231 (may also be referred to as sorting module) 231 for sorting a plurality of requests for small files, according to the adaptive embodiments disclosed herein. The sorting module 231 functionality is described below in detail.

It should be noted that the software "path" through the operating system layers described above needed to perform data storage access for the client request received at the storage server may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by storage server 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the storage server.

Figure 2B:
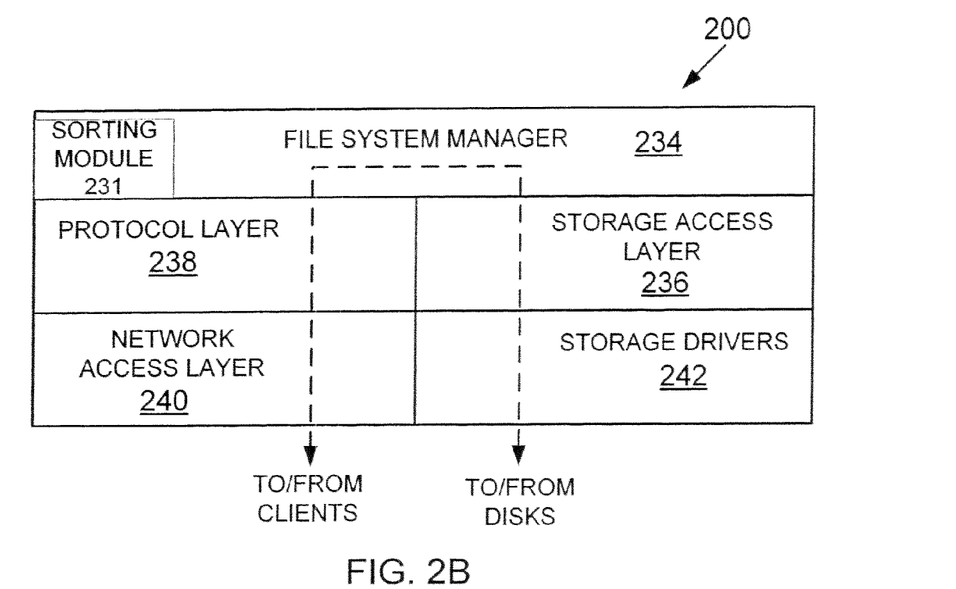
FIG. 2B shows another example of an operating system used by a storage server of FIG. 1.

FIG. 2B illustrates a generic example of operating system 200 for storage server 120, according to one embodiment of the present disclosure. In one example, operating system 200 may be installed on storage server 120. It is noteworthy that operating system 200 may be used in any desired environment and incorporates any one more of the features described herein.

In one example, operating system 200 may include several modules, or "layers." These layers include a system manager 234 that keeps track of a directory structure (hierarchy) of the data stored in a storage subsystem and manages read/write operations, i.e. executes read/write operations on disks in response to client 110 requests.

File system manager 234 includes the sorting module 231 for sorting a plurality of requests for small files, according to the adaptive embodiments disclosed herein and described below in detail.

Operating system 200 may also include a protocol layer 238 and an associated network access layer 240, to allow storage server 120 to communicate over a network with other systems, such as clients 110. Protocol layer 238 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 240 may include one or more drivers, which implement one or more lower-level protocols to communicate over the network, such as Ethernet. Interactions between clients 110 and mass storage devices 130 (e.g. disks, etc.) are illustrated schematically as a path, which illustrates the flow of data through operating system 200.

The operating system may also include a storage access layer 236 and an associated storage driver layer 242 to allow storage server 120 to communicate with a storage subsystem. The storage access layer 236 may implement a higher-level disk storage protocol, such as RAID (redundant array of inexpensive disks), while the storage driver layer 242 may implement a lower-level storage device access protocol, such as Fibre Channel Protocol (FCP) or SCSI. In one embodiment, the storage access layer 236 may implement a RAID protocol, such as RAID-4 or RAID-DP™ (RAID double parity for data protection provided by Network Appliance, Inc., the assignee of the present disclosure).

Figure 3:
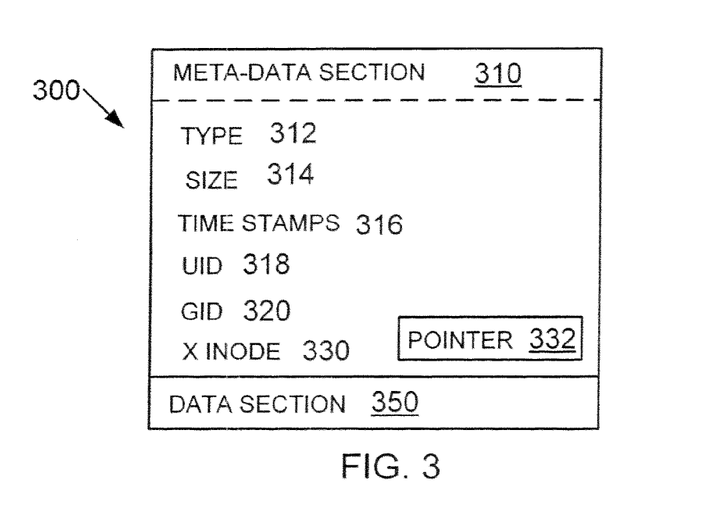
FIG. 3 shows a block diagram on an inode structure used by an operating system of a storage server.

Inode Structure:

FIG. 3 shows an example of an inode structure 300 (may also be referred to as inode 300) used according to one embodiment with the operating system 200 (FIG. 2A). Inode 300 may include a meta-data section 310 and a data section 350. The information stored in meta-data section 310 of each inode 300 describes a file and, as such, may include the file type (e.g., regular or directory) 312, size 314 of the file, time stamps (e.g., access and/or modification) 316 for the file and ownership, i.e., user identifier (UID 318) and group ID (DID 320), of the file. The metadata section 310 further includes a x-inode 330 with a pointer 332 that references another on-disk inode structure containing, e.g., access control list (ACL) information associated with the file or directory.

The contents of data section 350 of each inode 300 may be interpreted differently depending upon the type of file (inode) defined within the type field 312. For example, the data section 350 of a directory inode structure includes meta-data controlled by the file system, whereas the data section of a "regular inode" structure includes user-defined data. In this latter case, the data section 350 includes a representation of the data associated with the file.

Specifically, data section 350 of regular on-disk inode file may include user data or pointers, the latter referencing 4 KB data blocks for storing user data at a storage disk. Each pointer is preferably a logical volume block number to facilitate efficiency among the file system 230 and the disk storage, (RAID) layer 224 when accessing data stored in storage devices.

Inode structure 300 may have a restricted size (for example, 128 bytes). Therefore, user data having a size that is less than or equal to 64 bytes may be represented, in its entirety, within the data section of an inode. However, if the user data is greater than 64 bytes but less than or equal to for example, 64 kilobytes (KB), then the data section of the inode comprises up to 16 pointers, each of which references a 4 KB block of data stored a disk. Moreover, if the size of the data is greater than 64 kilobytes but less than or equal to 64 megabytes (MB), then each pointer in the data section 350 of the inode references an indirect inode that contains 1024 pointers, each of which references a 4 KB data block on disk.

A stored file may be designated as a "small file" if all the pointers for the stored data can be stored within a single inode structure, without any indirect reference to another inode structure. The adaptive aspects of the present disclosure solve the problem associated with reading small files, as described below. It is noteworthy that the adaptive embodiments disclosed herein are not limited to any particular methodology for defining a "small" file and a user may define a "small file" in different ways, depending on the type of storage sys application and data type.

Figure 4:
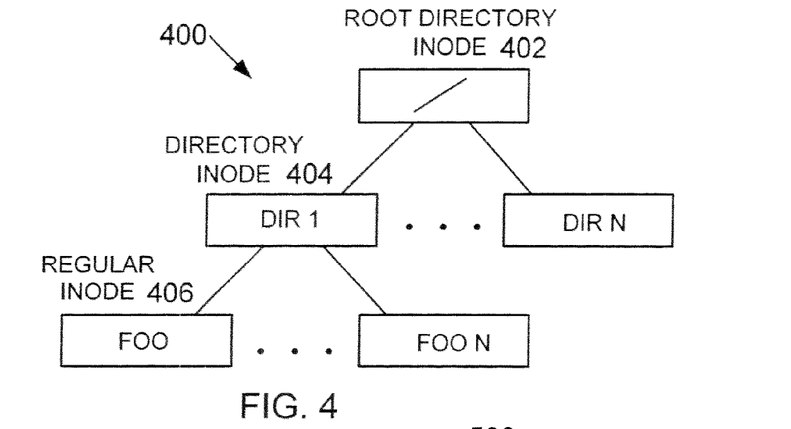
FIG. 4 shows a hierarchical inode structure used according to one embodiment of the present disclosure.

FIG. 4 is a schematic block diagram illustrating a hierarchical on-disk inode structure 400 used by the WAFL file system 230. Specifically, the WAFL layer 230 parses the first (/) preceding a pathname and maps it to a root inode structure 402 of its file system. The root inode is a directory with a plurality of entries, each of which stores a name of a directory and its corresponding mapping file handle. Operating system 200 can convert that handle to a disk block and, thus, retrieve a block (inode) from disk.

Broadly stated, a name is an external representation of an inode data structure, i.e., a representation of the inode as viewed external to the file system. In contrast, the file handle is an internal representation of the data structure, i.e., a representation of the inode data structure that is used internally within the file The file handle generally consists of a plurality of components including a file ID (inode number), a snapshot ID, a generation ID and a flag. The file handle is exchanged among the client and server (storage server 120) over the network to enable storage server 120 to efficiently retrieve a corresponding file or directory. That is, the file system 230 may efficiently access a file or directory by mapping its inode number to a block on disk using the inode file.

Accordingly, the WAFL layer 230 loads a root directory inode 402 from disk 130 into memory 124, such that the inode is represented as an incore inode, and loads any data blocks referenced by the incore root inode. The WAFL layer 230 then searches the contents or the root inode data blocks for a directory name "DIR1". If the DIR1 directory name is found in those data blocks, the WAFL layer 230 uses the corresponding file handle to retrieve the DIR1 directory inode 404 from disk and loads it (and its data blocks) into memory as an incore inode structure(s). As with the root inode, the directory inode has a plurality of entries; here, however, each entry stores a name of a regular file and its corresponding mapping file handle.

The WAFL layer searches the entries of the DIR1 directory inode data blocks to determine whether a regular inode file name, for example, "foo" exists and, if so, obtains its corresponding file handle (inode number) and loads the regular inode 406 from disk. The WAFL layer then returns the file handle for the file name "foo" to DIPS layer 218 of the operating system 200.

Figure 5A:
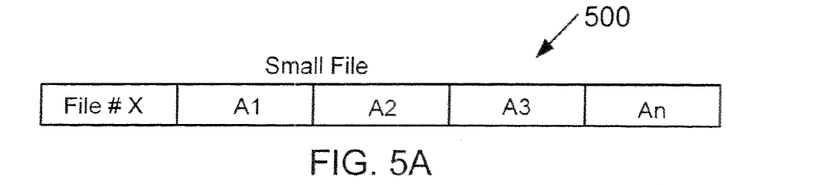
FIGS. 5A and 5B show examples of a small file and a large file, used in one embodiment of the present disclosure.

Small File vs Large Files:

FIG. 5A shows an example of a small file, as used according to one embodiment. Inode structure 500 shows File #X with a plurality of addresses (A1 to An). A1 to An represent pointers to the data blocks for File #X.

Figure 5B:
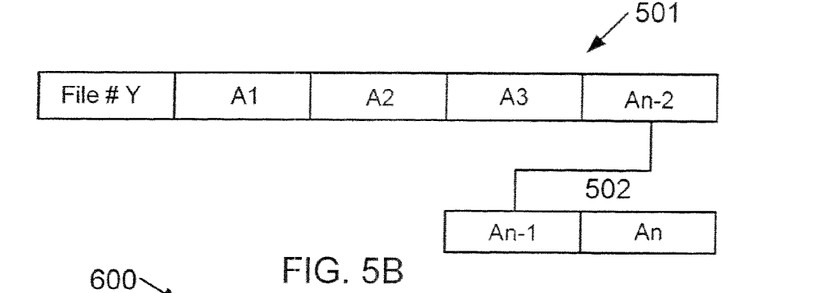

FIG. 5B shows an example of a large file, where a file #Y in inode structure 501 is indirectly linked to inode structure 502. Structure 501 includes addresses A1-An-2; while structure 502 includes addresses An-1 to An.

Figure 6:
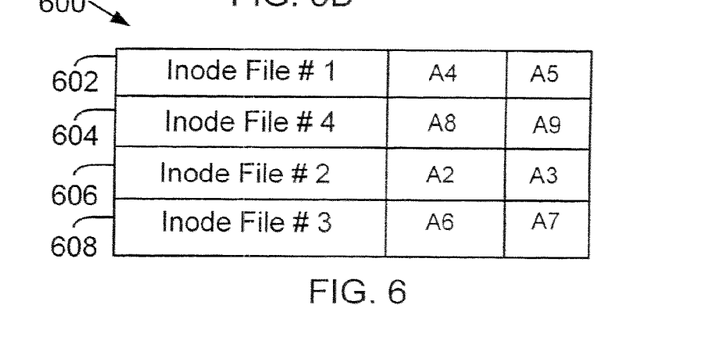
FIG. 6 shows an example of a plurality of requests to access small files.

FIG. 6 shows an example of how read requests for a plurality of files may be received by operating system 200. Table 600 shows the sequence of requests as received by operating system 200. Rows 602 to 608 show the requests, where row 602 is received first and row 608 is the last request. Row 602 shows a request for inode File #1 with address A4 and A5, Row 604 shows a request for inode file #4 with address A8 and A9. Row 606 shows a request for inode File #2 with address A2 and A3. Row 608 shows request for File #1 with address A6 and A7.

In a conventional system, the requests are processed on a first come, first serve basis. As is well known in the art, to read data from a storage device, for example, hard disk, a reading mechanism (or a read head) (not shown) typically scans the storage media to read the stored files/blocks (used interchangeably). To access the requested data in rows 602-608, a conventional system, a read head has to move from (A4, A5), (A8, A9), (A2, A3) and then (A6, A7). In this example there are only 4 requests, however, if an application sends, for example, 100 requests for small files, the read head scans an entire storage disk, in a random order numerous times. This approach for accessing small files is inefficient because the computing power is wasted while a reading mechanism is repeatedly scanning a storage media. The embodiments described herein provide a better solution.

In one embodiment, the sorting module 231 (FIGS. 2A and 2B) in the file system gathers a plurality of requests. If the number of requests is equal to a threshold value (for example, 100 requests), then the requests are sorted by using the first address block (for example, in row 602, A4), for example, in a chronological order. The reason for using the first address block is that one can assume in a small file with more than one address blocks that the address blocks are most likely to be next to each other. Since only the first address block is used for sorting the requests, the sorting process is quite fast and efficient. The file system provides the sorted list to the storage layer and the data is retrieved in that order.

With respect to the example shown in FIG. 6, after the requests are sorted they are processed in the following order: Inode File #2, Inode File #1, Inode File #3 and Inode File #4. Hence, the read head of a storage device accesses data blocks stored at addresses A2, A3, A4, A5, A6, A7, A8 and A9 in a sequential order, unlike the random order of a conventional system that is described above. In the sorted list, because address blocks are in a sequential order, the read head of a storage device simply moves in one direction with minor deviations. This saves time and computing resources.

Figure 7:
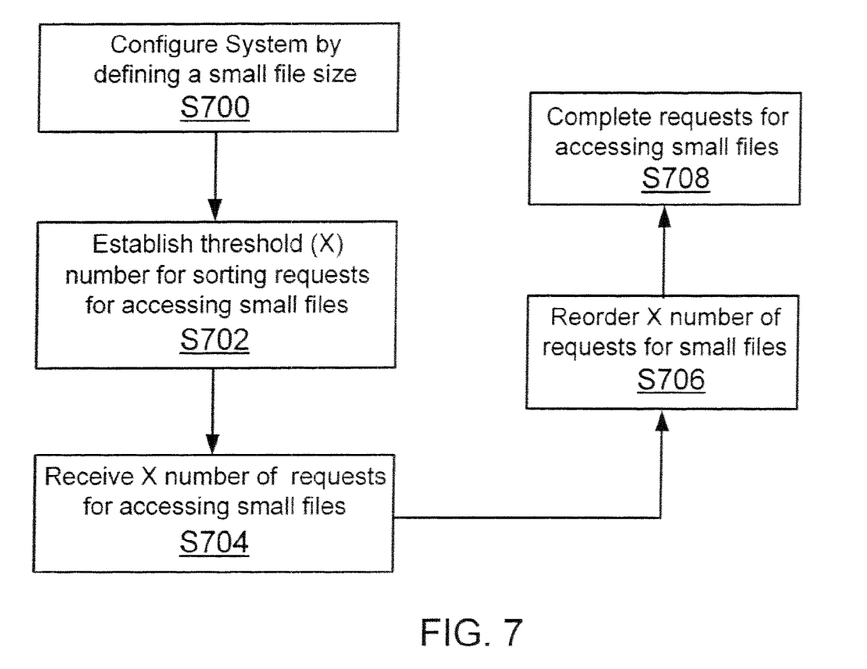
FIGS. 7 and 8 show process flow diagrams for processing requests for accessing stored information, according to one embodiment.

Process Flow:

FIG. 7 shows a process flow diagram for processing read requests, according to one embodiment. The process flow diagram is described below with respect to the systems described above, but one can appreciate that the process flow may be implemented in any other system.

Turning in detail to FIG. 7, the process begins in step S700, when a small file is defined for the storage server 120. A user using a computing system with the appropriate authority to storage server 120 may define a small file for the file system.

After establishing the small file size/parameters, a threshold value (X) is established for reordering read requests. The threshold value depends on the type application for which one may want to use the "reordering" process of the present embodiment. For example, if one is performing an anti-virus scan on stored data, then the threshold value may be higher; for example, 100-500 read requests, before the file system reorders the received requests. It is noteworthy that the present embodiments are not limited to any particular threshold value.

In step S704, the file system receives X number of requests, where X is the threshold value for reordering requests. The requests may be from an application for performing a virus scan, a back-up operation, indexing files or any other operation.

In step S706, the read requests are reordered. The reordering process is described below with respect to FIG. 8. Thereafter, in step S708, all the read requests are processed.

Figure 8:
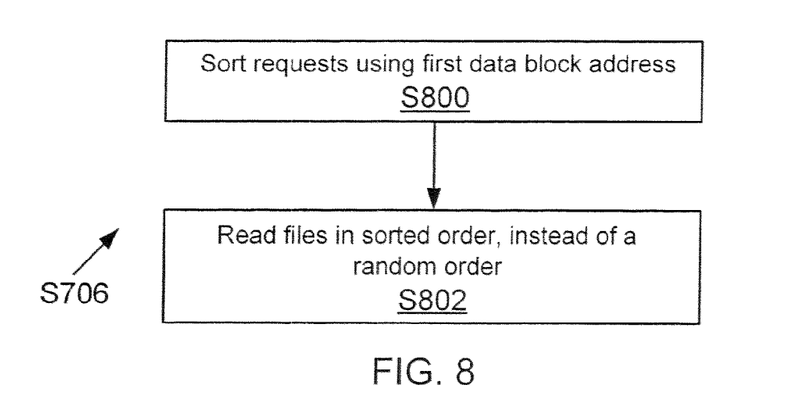

FIG. 8 shows the process steps for step S706 (FIG. 7). The reordering process begins in step S800, where the read requests are sorted by using the first address block. In one embodiment, sorting module 21 sorts requests.

In step S802, the files are read in the sorted order. Turning to the FIG. 6 example, the requests are sorted so that the files are accessed in the following order: File #2 (A2, A3), File #1 (A4, A5), File #3 (A6, A7) and File #4 (A8, A9). AS seen in this example, to access numerous small files, the read head of a storage device will move in a sequential order, rather than a random order.

In one embodiment, the process and system disclosed herein improves the overall speed at which small files are read. The improvement occurs because the process sorts a plurality of small files based on the first data block address for each file. A reading mechanism for a storage device scans data blocks that are next to each other, in a sorted, sequential order. This is advantageous over conventional systems because in conventional systems to read a plurality of small files, the reading mechanism scans the storage device in a random order. The random order used by conventional systems is typically based on the order in which the actual requests for the small files are received. To access a plurality of small files, in some applications, thousands of small files; the reading mechanism has to move across the storage media numerous times. In contrast, in the process disclosed herein, the reading mechanism moves in a sorted order access the requested small files. This reduces the number of times the reading mechanism has to scan the storage media and hence improves the overall speed at which small files are accessed.

In yet another embodiment, the sorting methodology is efficient because it is based on using the address of the first data block of a small file. This is useful because one does not waste a lot of computing power to sort the various requests for small files.

The process disclosed herein is useful in various operating environments. For example, without limitation, the process is useful in accessing small files in applications involving virus scanning, backup, file scanning, file indexing and other operations.

While the present disclosure is describe above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method for accessing a plurality of files stored at a storage device, comprising:
a processor for implementing:
defining a parameter for determining if a stored file from among the plurality of files stored at the storage device is a small file;
wherein a file is a small file, if block addressees for all data blocks for the file are stored within a metadata segment of a data structure without being linked to another data structure;
establishing a programmable threshold value for accessing a plurality of small files in an order different from an order in which requests for the plurality of small files are received; wherein the programmable threshold value is based on an application type that generates the requests for the plurality of small files;
receiving a plurality of requests for accessing the plurality of small files stored at the storage device;
determining if the plurality of requests are equal to or exceed the programmable threshold value;
sorting the plurality of requests using a first address block for each of the plurality of small files if the plurality of requests are equal to or exceed the programmable threshold value; wherein the first address block from among a plurality of address blocks for a small file provides an address of a first data block storing information for the small file; and
accessing the plurality of small files using the sorted order, instead of randomly accessing files based on an order in which the plurality of requests are received.

2. The method of claim 1, wherein a sorting module sorts the plurality of requests for accessing the plurality of small files, the sorting module being executed by a computing system that receives the plurality of requests from an application.

3. The method of claim 2, wherein the sorting module uses metadata with information regarding the stored files at the storage device to sort the plurality of requests.

4. The method of claim 3, wherein the metadata includes a block address for each of the data block for a requested file.

5. The method of claim 1, wherein the plurality of requests are for scanning the plurality of files for performing a virus scan operation.

6. The method of claim 1, wherein the plurality of requests are for performing a back up operation.

7. The method of claim 1, wherein the plurality of requests is for an indexing operation to index the plurality of files stored at the storage device.

8. A system, comprising:
a processor executable storage system configured to receive a plurality of requests for accessing a plurality of small files stored at a storage device;
wherein the storage system is configured to compare a number of the plurality of requests to a programmable threshold value and if the number of plurality of requests is equal to or exceeds the programmable threshold value, then instead of processing the plurality of requests in an order in which the requests are received, the storage system processes the plurality of requests in a sorted order determined by executing a sorting module that sorts the plurality of requests based on a first data block address for each of the requested file, where the first data block address is included in a data structure for each of the stored small files and provides an address for a first data block of each of the stored small files;
wherein a file is a small file if all data block addresses for the file are included within the data structure; and
wherein the programmable threshold value is set based on an application type that generates the plurality of requests for the small files.

9. The system of claim 8, wherein the sorting module uses metadata with information regarding stored files at the storage device to sort the plurality of requests;

and the metadata includes block address of each of the data block for a requested file.

10. The system of claim 8, wherein the plurality of requests are for scanning the plurality of files for a virus scan operation.

11. The system of claim 8, wherein the plurality of requests are for performing a back up operation.

12. The system of claim 8, wherein the plurality of requests are for an indexing operation to index a plurality of files stored at the storage device.

13. A system for processing a plurality a plurality of requests for accessing a plurality of small files stored at a storage device, comprising:

a plurality of data structures, where each data structure includes a plurality of pointers referencing a plurality of data blocks for a file stored at the storage device and a file is considered to be a small file if all data block address pointers for the file are included in a single data structure without being linked to another data structure; and a processor executable sorting module for sorting the plurality of requests using a first data block address for each requested small file if a number of plurality of requests is equal to or exceeds a programmable threshold value that is set based on an application type that generates the plurality of requests for the small files;

wherein the first data block address provides an address for a first data block of each of the stored small files; and wherein the plurality of requests are processed based on the sorted plurality of requests, instead of processing the plurality of requests in an order in which the requests are received.

14. The system of claim 13, wherein the plurality of requests are for scanning the plurality of files for a virus scan operation.

15. The system of claim 13, wherein the plurality of requests are for performing a back up operation.

16. The system of claim 13, wherein the plurality of requests are for an indexing operation to index the plurality of files stored at the storage device.

17. A method, comprising:

a processor for implementing:

establishing a programmable threshold value for accessing a plurality of small data containers stored at a storage device in an order different from an order in which requests for the plurality of small data containers are received; wherein a data container is a small data container, if addressees for all data blocks for the data container are stored within a data structure without being linked to another data structure; and the programmable threshold value is based on an application type that generates the requests for the plurality of small data containers;

receiving a plurality of requests for accessing the plurality of small data containers stored at the storage device;

determining if the plurality of requests are equal to or exceed the programmable threshold value;

sorting the plurality of requests using a first address block for each of the plurality of small data containers, if the plurality of requests are equal to or exceed the programmable threshold value; wherein the first address block from among a plurality of address blocks for a small data container provides an address of a first data block storing information for the small data container; and accessing the plurality of small data containers using the sorted order, instead of randomly accessing data containers based on an order in which the plurality of requests are received.

18. The method of claim 17, wherein the plurality of requests are for scanning the plurality of small data containers for performing a virus scan operation.

19. The method of claim 17, wherein the plurality of requests is for performing a back up operation.

20. The method of claim 17, wherein the plurality of requests is for an indexing operation to index the plurality of small data containers stored at the storage device.

\* \* \* \* \*